US012577480B2

(12) United States Patent
Fox

(10) Patent No.: US 12,577,480 B2
(45) Date of Patent: Mar. 17, 2026

(54) PROCESS AND SYSTEM FOR CONVERTING WASTE PLASTIC INTO POWER

(71) Applicant: University of South Africa, Pretoria (ZA)

(72) Inventor: James Alistair Fox, Pretoria (ZA)

(73) Assignee: University of South Africa, Pretoria (ZA)

( * ) Notice: Subject to any disclaimer, the term of this patent is extended or adjusted under 35 U.S.C. 154(b) by 917 days.

(21) Appl. No.: 17/292,366

(22) PCT Filed: Nov. 7, 2019

(86) PCT No.: PCT/IB2019/059566
§ 371 (c)(1),
(2) Date: May 7, 2021

(87) PCT Pub. No.: WO2020/095240
PCT Pub. Date: May 14, 2020

(65) Prior Publication Data
US 2022/0002626 A1     Jan. 6, 2022

(30) Foreign Application Priority Data

Nov. 7, 2018    (ZA) ................................ 2018/07454

(51) Int. Cl.
*F23G 5/46*        (2006.01)
*C10J 3/46*        (2006.01)
(Continued)

(52) U.S. Cl.
CPC . *C10J 3/72* (2013.01); *C10J 3/46* (2013.01); *F01K 15/00* (2013.01); *F01K 17/06* (2013.01); *F02C 6/04* (2013.01); *F23G 5/46* (2013.01);

*F23G 7/12* (2013.01); *C10J 2300/0946* (2013.01); *C10J 2300/0976* (2013.01);
(Continued)

(58) Field of Classification Search
CPC ................. Y02E 20/16; C10J 2300/165; C10J 2300/1675; C10J 2300/1687; C10J 3/86
See application file for complete search history.

(56) References Cited

U.S. PATENT DOCUMENTS 5,134,944 A * 8/1992 Keller ...................... B09B 3/00
48/DIG. 2
8,221,513 B2 7/2012 Ariyapadi et al.
(Continued)

FOREIGN PATENT DOCUMENTS

WO    2004/112447 A2    12/2004
WO    2013/038001 A    3/2013

*Primary Examiner* — Imran Akram
(74) *Attorney, Agent, or Firm* — Knobbe, Martens, Olson & Bear, LLP

(57) ABSTRACT

The invention relates to a process and system for converting carbon material into power. Carbon material 12 is gasified into synthesis gas 18 in a gasifier 16, and steam 14 is supplied to the gasifier 16. The synthesis gas 18 is supplied to a gas turbine 30, 36, 38 to produce power. Air 24 is added to the synthesis gas 18 prior to the gas turbine 30, 36, 38. Exhaust gas 40 from the gas turbine 30, 36, 38 is cooled in a first cooling device 42 with water 46 to produce steam 52. The steam is used in at least one steam turbine to produce power 56 and the steam 58 from at least one steam turbine 56 is recycled to the gasifier 16.

9 Claims, 7 Drawing Sheets

(51) Int. Cl.

| | |
|---|---|
| *C10J 3/72* | (2006.01) |
| *F01K 15/00* | (2006.01) |
| *F01K 17/06* | (2006.01) |
| *F02C 6/04* | (2006.01) |
| *F23G 7/12* | (2006.01) |

(52) U.S. Cl.

CPC .. *C10J 2300/165* (2013.01); *C10J 2300/1653* (2013.01); *C10J 2300/1675* (2013.01); *C10J 2300/1853* (2013.01); *C10J 2300/1876* (2013.01); *C10J 2300/1884* (2013.01); *C10J 2300/1892* (2013.01); *F05D 2220/31* (2013.01); *F05D 2220/32* (2013.01); *F23G 2206/203* (2013.01); *F23G 2209/28* (2013.01)

(56) References Cited

U.S. PATENT DOCUMENTS

| | | | | |
|---|---|---|---|---|
| 2006/0210457 A1* | 9/2006 | Sprouse | .................. | C10J 3/485 |
| | | | | 422/198 |
| 2007/0129450 A1* | 6/2007 | Barnicki | ................. | C10J 3/721 |
| | | | | 518/704 |
| 2008/0147241 A1 | 6/2008 | Tsangaris et al. | | |
| 2009/0188165 A1* | 7/2009 | Ariyapadi | ................ | C10J 3/463 |
| | | | | 48/210 |
| 2011/0036096 A1* | 2/2011 | Bommareddy | .......... | C10J 3/721 |
| | | | | 60/39.12 |
| 2011/0048011 A1 | 3/2011 | Okita et al. | | |
| 2011/0146278 A1* | 6/2011 | Deng | ...................... | F01K 23/10 |
| | | | | 60/676 |
| 2012/0137701 A1* | 6/2012 | Stevanovic | ............... | F02C 7/08 |
| | | | | 60/39.12 |
| 2013/0055637 A1* | 3/2013 | Ariyapadi | ................ | C10J 3/482 |
| | | | | 48/119 |
| 2013/0252115 A1 | 9/2013 | Hong et al. | | |
| 2014/0250858 A1* | 9/2014 | Mazumdar | ............... | C10J 3/721 |
| | | | | 48/89 |
| 2016/0017801 A1 | 1/2016 | Xue et al. | | |

* cited by examiner

PROCESS AND SYSTEM FOR CONVERTING WASTE PLASTIC INTO POWER

CROSS-REFERENCE TO RELATED APPLICATIONS

This application is the U.S. National Phase under 35. U.S.C. § 371 of International Application PCT/IB2019/059566, filed Nov. 7, 2019, which claims priority to South African Patent Application No 2018/07454, filed Nov. 7, 2018. The disclosures of the above-described applications are hereby incorporated by reference in their entirety.

BACKGROUND TO THE INVENTION

THIS invention relates to a process and system for converting waste plastic into power, in particular using an Integrated Gasification Combined Cycle.

The production of plastics is big business; projections predict the plastics market to be worth over 650-billion US-dollars by 2020 [1,2], in an industry that has seen steady growth for over 50 years [3]. Such growth inevitably comes with the production of waste, estimates predict waste plastic production will exceed 450-million metric tons per year by 2020 [4].

Much of this waste; 51% of the world's waste production, according to Reuters [5], was imported by China, leading many to adopt an "out of sight-out of mind" attitude. At the end of 2017, China instituted a ban on imports of waste plastic forcing many nations to re-evaluate their waste management strategies.

Significant portions of waste plastic end up in landfill or in the world's oceans [6] and eventually entering the food chain. Combined with the slow degradation rate of plastics (potentially in excess of 1000 years), it is becoming clear that an environmental crisis is looming.

Despite this, the convenience and low cost of plastics will probably see the industry itself continue to grow, with the production of virgin plastics and accompanying waste, to continue virtually unabated.

Strategies and technologies, that address the vast amounts of waste plastic produced by modern society, are needed in order to avert a looming environmental crisis.

It is accordingly an object of the invention to provide an alternative process and/or system for converting waste plastic into power.

It is accordingly an object of the invention to provide a process and/or system for converting waste plastic into power that will, at least partially, alleviate the above disadvantages.

SUMMARY OF THE INVENTION

According to a first embodiment of the invention there is provided a process for converting carbon material, for example waste plastic typically polyethylene or polyethylene terephalate, into power, comprising the steps of:
- a. gasifying the carbon material into synthesis gas in a gasifier, wherein steam is supplied to the gasifier;
- b. supplying the synthesis gas to a gas turbine to produce power, wherein air is added to the synthesis gas prior to the gas turbine;
- c. cooling exhaust gas from the gas turbine in a first cooling device with water to produce steam; and
- d. using steam produced in step c in at least one steam turbine to produce power;

wherein the steam from step d may be recycled to the gasifier.

The temperature of the gasifier may be between 800K and 1200K, preferably between 900K and 1100K and more preferably 1000K. The pressure of the gasifier is preferably between 0.5 to 1.5 bar.

The temperature of combustion in the gas turbine may be below 1800K, preferably below 1600K and more preferably below 1300K.

Typically the process comprises two steam turbines. Preferably the steam from a first steam turbine is sent to a decompression device, such as an adiabatic decompression device, before being sent to a second steam turbine, preferably the steam from the second steam turbine is dry saturated steam.

The exhaust gas from the first cooling device is either vented to the atmosphere or sent to carbon sequestration.

The process may further comprise a second cooling device for cooling synthesis gas from the gasifier.

Typically, the steam from the first cooling device is sent to the second cooling device or the steam from the second cooling device is sent to the first cooling device and the steam produced is used in the at least one steam turbine. The steam produced having a temperature of preferably between 570K and 980K, more preferably between 650K and 800K and preferably 770K. The pressure of the steam produced may be between 120 bar and 80 bar, preferably 110 bar and 90 bar and more preferably 100 bar.

The process may further comprise a pump to increase the pressure of water prior to being sent to the first cooling device or second cooling device.

Power from the gas turbine or steam turbine or power from a renewable energy source, such as wind or solar power, or a combination of at least two or more, are/is preferably used in the gasifier.

According to a second embodiment of the invention there is provided a system for converting carbon material, for example waste plastic, typically polyethylene or polyethylene terephalate, into power, comprising:
- a. a gasifier for gasification of carbon material into synthesis gas, wherein steam is supplied to the gasifier;
- b. a gas turbine for producing power from the synthesis gas, wherein air is added to the synthesis gas prior to the gas turbine;
- c. a first cooling device for cooling exhaust gas from the gas turbine with water to produce steam; and
- d. at least one steam turbine for producing power from the steam produced in step c;

wherein the steam from step d may be recycled to the gasifier.

The gasifier is operable at a temperature of may be between 800K and 1200K, preferably between 900K and 1100K and more preferably 1000K. The gasifier is preferably operable between 0.5 to 1.5 bar.

The gas turbine is operable at a temperature of may be below 1800K, preferably below 1600K and more preferably below 1300K.

Typically the system comprises two steam turbines. Preferably the steam from a first steam turbine is sent to a decompression device, such as an adiabatic decompression device, before being sent to a second steam turbine, preferably the steam from the second steam turbine is dry saturated steam.

The exhaust gas from the first cooling device is either vented to the atmosphere or sent to carbon sequestration.

The system may further comprise a second cooling device for cooling synthesis gas from the gasifier.

Typically, the steam from the first cooling device is sent to the second cooling device or the steam from the second cooling device is sent to the first cooling device and the steam produced is used in the at least one steam turbine. The steam produced having a temperature of preferably between 570K and 980K, more preferably between 650K and 800K and preferably 770K. The pressure of the steam produced may be between 120 bar and 80 bar, preferably 110 bar and 90 bar and more preferably 100 bar.

Power from the gas turbine or steam turbine or power from a renewable energy source, such as wind or solar power, or a combination of at least two or more are/is preferably used in the gasifier.

The system may further comprise a pump to increase the pressure of water prior to being sent to the first cooling device or second cooling device.

DESCRIPTION OF AN EMBODIMENT OF THE INVENTION

Figure 1:
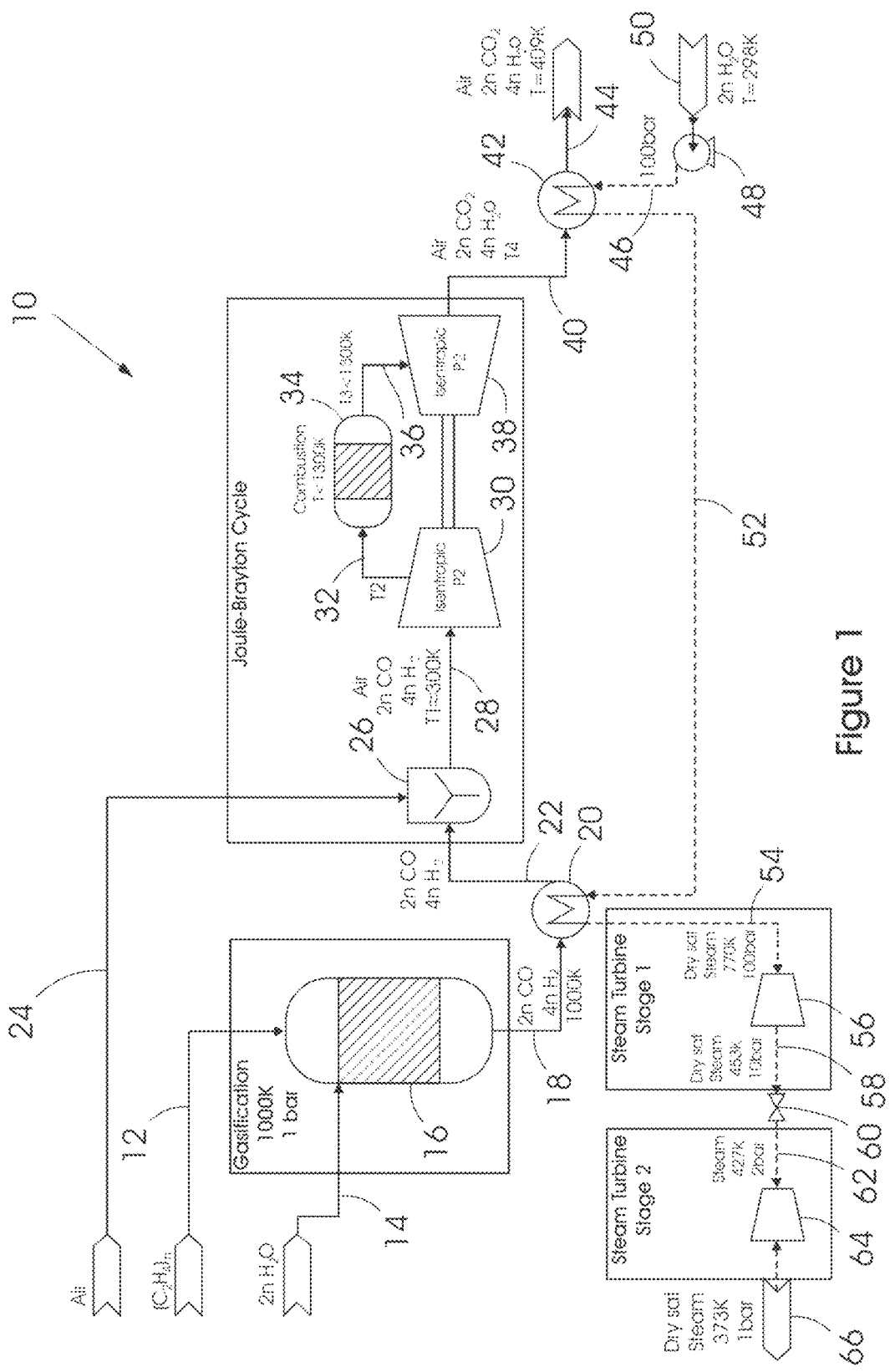
FIG. 1 is a process flow diagram for converting waste plastic, in particular polyethylene, waste into power using an Integrated Gasification Combined Cycle (IGCC) and a water utility system.

The present invention seeks to reduce the amount of waste plastics, notably polyethylene and polyethylene terephalate, by gasification into synthesis gas and then uses a gas engine to produce power. The present invention addresses both the severe environmental impact of waste plastic and the short-ages of power in many countries.

Integrated Gasification Combined Cycle (IGCC) has been extensively studied using fossil fuels and biomass [7-9]. IGCC is a technology that involves using a carbonaceous fuel to generate synthesis gas (a mixture primarily composed of hydrogen and carbon monoxide, along with some amount of carbon dioxide and water) using partial oxidation. This synthesis gas is then combusted in a gas turbine (the Joule-Brayton cycle) to generate power. Some additional power generation can be achieved by raising steam from the hot exhaust steams and sending that steam into a steam turbine (Rankine cycle).

The present invention provides an IGCC using waste plastic, in particular polyethylene waste plastic, as the fuel but departs from other approaches by accomplishing the gasification of the polyethylene without the use of oxygen (or air) and instead use only steam or water. The goal is to avoid the use of air enrichment or separation (and the energy costs that come with those technologies).

Other types of plastics, such as polyethylene terephalate (PET), would be viable in this system since the gasification could be designed to decompose any benzene and benzene aromatics that result from the thermal decomposition of PET. This system would be unsuitable for Polyvinyl-chloride plastics due to the production of highly corrosive hydrogen chloride.

This approach to waste plastic disposal is essentially a form of plastic incineration. However, this incineration that seeks to recover as much energy as possible, resulting in a reduction in waste volume and the production of power.

The present invention presents a processing system that produces power from polyethylene waste plastic. The IGCC system can produce between 13 and 18 GJ of power per ton of polyethylene, compared to that of coal, which is around 9.6 GJ per ton of coal, at a thermal efficiency in the region of 45-55%, all without the use of oxygen or air during gasification. It was also found that the systems could be designed to recover a significant portion of the latent heat of water and that the energy production per mass of polymers is actually independent of the size of the polymer.

The method makes use of steam gasification without the addition of oxygen. The inventor believes that without the addition of air during the gasification process, the associated energy costs with be reduced.

The present invention provides a method for recovery of at least some of the latent heat through the use of an integrated process-utility system, an approach that is rarely practiced and has never been implemented on a waste to energy system.

The present invention uses the synthesis gas to generate electricity and to supply the energy needed for the gasification itself. However, this is not the only use for synthesis gas; there are many applications for synthesis gas.

Example

The first step in any IGCC system is to gasify the carbon fuel into synthesis gas, a mixture of carbon monoxide and hydrogen. In this example, the carbon fuel is polyethylene. The chemical formula for polyethylene is conveniently written in terms of its ethylene monomer:

$$(C_2H_4)_n$$

Where:

n is the number of monomers.

Polyethylene molecule chains can contain thousands of monomers that can vary widely between different molecules. To deal with this variance, all the material and energy balances in terms of the "monomer count"; n will be carried out. Using this approach, the analysis can simply be scaled for any value of n. Another approach would be to choose an appropriate value for n to use throughout the analysis.

It can be shown that the energies of formation for polyethylene increase linearly as the number of monomers in the chain grows, the enthalpy and Gibbs free energy of formation of polyethylene can be defined, in terms of n, as:

$$\Delta H^0_{f,(-C_2H_4-)_n} = -94.26n \ \text{kJ/mol}$$

$$\Delta G^0_{f,(-C_2H_4-)_n} = -36.44n \ \text{kJ/mol}$$

With this data, it is a simple matter to write the material balance for polyethylene gasification using steam as the oxidant:

$$(-C_2H_4-)_n + 2nH_2O(l) \to 2nCO + 4nH_2$$

A simple application of thermodynamic equilibrium models reveals that this material balance would be extremely favourable and spontaneous at higher temperatures. At 1000K, this material balance would proceed close to completion. This temperature is not so high as to require exotic materials of construction but is high enough for favourable conversion. It is sufficient to assume that the process is predicted to proceed to completion.

If the polyethylene and water is fed to the gasification at ambient conditions, the energy balance on this system at 1000K is as follows:

$$\Delta H_{gasification} = 4n\left(\int_{298K}^{1000K} C_{p,H_2} dT\right) +$$

$$2n\left(\Delta H^0_{f,CO} + \int_{298K}^{1000K} C_{p,CO} dT\right) - 2n\Delta H^0_{f,H_2O} - \Delta H^0_{f,(-C_2H_4-)_n} = 571.1n \ \text{kW}$$

Where:
$\Delta H_{gasification}$ is the energy required to carry out polyethylene gasification at 1000K
Cp is the heat capacity of the relevant component
T is temperature
Stoichiometric coefficients represent flow rates in mol/s.
In the absence of oxygen, a significant amount of energy is needed, 571 n kW for every 1 mol/s of polyethylene fed to gasification. This energy needs to come from somewhere. This will be discussed later.

Polyethylene IGCC: Waste-to-Power System

The waste polyethylene IGCC system (10) is shown in FIG. 1. The two most important parameters for this system are the compression ratio in the Joule-Brayton cycle (henceforth referred to as simply the "Brayton cycle") compressor and the airflow. These parameters affect the dependent variables, notably the temperatures, total power output and the thermal efficiency of the system as a whole.

To investigate these effects, the system was simulated in ASPEN Plus and ASPEN ASW, using the Soave-Redlich-Kwong (SRK) Equation of state.

With reference to FIG. 1, 1 mol/s of polyethylene (12) is gasified in a gasifier (16) with 2 n mol/s of water (14) at 1000K and 1 bar pressure. The gasification (16) temperature and pressure is chosen on a thermodynamic basis for complete gasification. Different conditions may be preferable for many reasons, such as kinetics.

The syngas (18) leaving the gasifier (16) is cooled, for example in a heat exchanger (20), with water (52) before being mixed, for example in a mixer (26), with air (24). The flow rate of air (24) is chosen primarily to ensure complete combustion of the synthesis gas (22). The air and syngas mixture (28) is fed to the compressor (30). This combustion (34) releases a large amount of energy. The adiabatic temperature rise of syngas combustion with stoichiometric oxygen can exceed 4000K. In stoichiometric air, the temperature can exceed 1400K.

The Carnot principle, summarized as [Eq. 1], $$\mu_{thermal} = 1 - \frac{T_h}{T_c} \quad \text{[Eq. 1]}$$

Where:
μthermal is the thermal efficiency of an engine
Th is the temperature of the hot reservoir/engine
Tc is the temperature of the cold reservoir/exhaust.
Clearly shows that the higher the temperature in any power cycle, the higher the efficiency and the higher the efficiency, the more power the engine will produce. However, there are material limitations. Keeping this temperature in a manageable region is accomplished by feeding in excess air. The present invention generally attempts to keep combustion temperature below 1300K, which is high for nickel alloys but does not require super-alloys.

The compressor (30) and turbine (38) of the Brayton cycle (30-38) are assumed to perform isentropically. The thermal efficiency of the Brayton cycle is well understood and the derivation can be found in a multitude of sources [10, 11] and applied thermodynamics textbooks. This thermal efficiency is easily defined and calculated using a small modification of $$\mu_{thermal} = 1 - \frac{T_1}{T_2} \quad \text{[Eq. 2]}$$

Where:
$T_1$ is the temperature of the stream (28) entering the compressor
$T_2$ is the temperature of the stream (32) leaving the compressor.
The temperature of the stream (32) leaving the compressor is preferably between 400K to 900K. The hot exhaust (40), preferably at a temperature between 400K to 900K, leaving the turbine (38) is cooled by water (46), for example in a heat exchanger (42), producing a cooler hot exhaust (44), before either being vented to atmosphere or proceeding to some form of carbon sequestration.

On the utility side, the dashed lines on FIG. 1, water (50) is first pumped (48) to 100 bar (46) and is then used to cool the hot exhaust (40) from the system and the water (52) is then used to cool the syngas (18) leaving the gasifier (16). The final objective was to raise steam at 100 bar and 770 K (54), which are conditions typically handled by commercially available steam turbines.

In "Stage 1", the steam (54) passes through an isentropic turbine (56) and leaves as dry saturated steam (58). Since the pressure of this steam (58) is still elevated (10-12 bar), a second stage is included to bring the steam down to ambient pressure and recover a little extra work at the same time. The steam (58) goes through an adiabatic decompression (60) and the steam (62) from the adiabatic decompression (60) is sent to the "Stage 2" steam turbine (64). Dry saturated steam (66) is exhausted from the final turbine (64). This dry saturated steam (66) has a number of uses: It can be cooled and sent back to the pumping system, this allows for a "closed-loop" water utility. Alternatively, it could be sent to the gasifier as a feed, as an "integrated" water utility, which would have a profound effect on the energy efficiency of the system.

Case 1: Closed Loop Water Utility System

Both the combustion temperature and the work output of the system depends on the airflow. The closer the airflow is to the stoichiometric requirement, the higher the combustion temperature will be and the more efficient the Brayton cycle, according to [Eq. 2].

Figure 2:
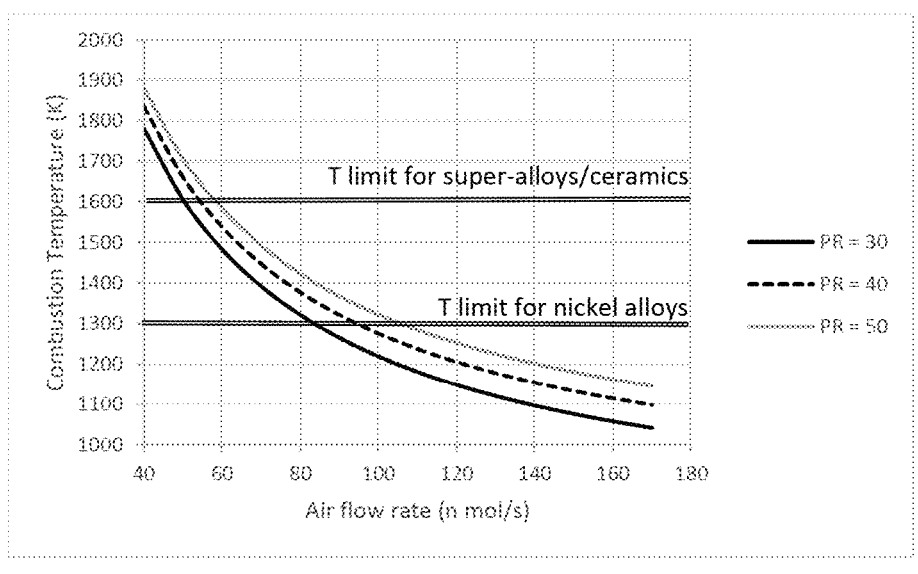
FIG. 2 is a diagram of combustion temperature as a function of air flow rate and pressure ratio, showing typical temperature limits of materials of construction.

FIG. 2 shows how the combustion temperature varies with air flow rate and pressure ratio (defined as the pressure leaving the compressor divided by the pressure entering the compressor). An airflow rate of 40 n mol/s, where "n" is the number of monomers, is the flow of air that provides the stoichiometric amount of oxygen need for complete combustion of syngas. Low airflow rates result in combustion temperatures that are beyond the operating limits for most materials of construction. Super-alloys or ceramics would need an airflow rate of 50 n mol/s to bring the combustion temperature below 1600K. Nickel alloys would need an airflow rate over 80 n mol/s for temperatures under 1300K.

Figure 3:
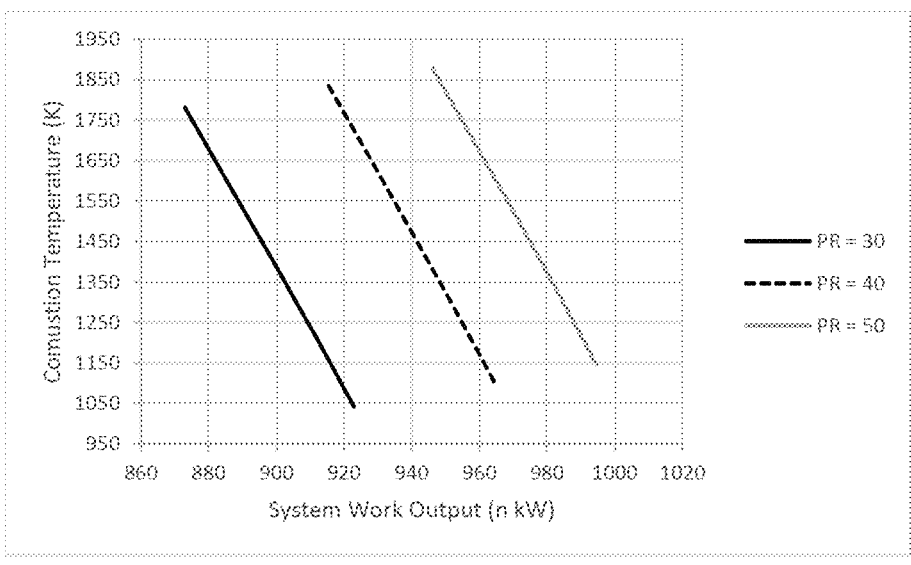
FIG. 3 is a diagram of Brayton cycle and steam turbine (system) work output as a function of the combustion temperature.

FIG. 3 presents the total work output from the Brayton cycle and the steam turbines. As expected, higher compression ratios result in greater work output however; it does appear to be unusual that higher temperatures appear to result in less work output. The Carnot principle clearly shows that higher temperature results in higher efficiency, which should then result in higher work output but simulations appear to contradict this. An explanation for this can be found by using a variation of FIG. 3.

Figure 4:
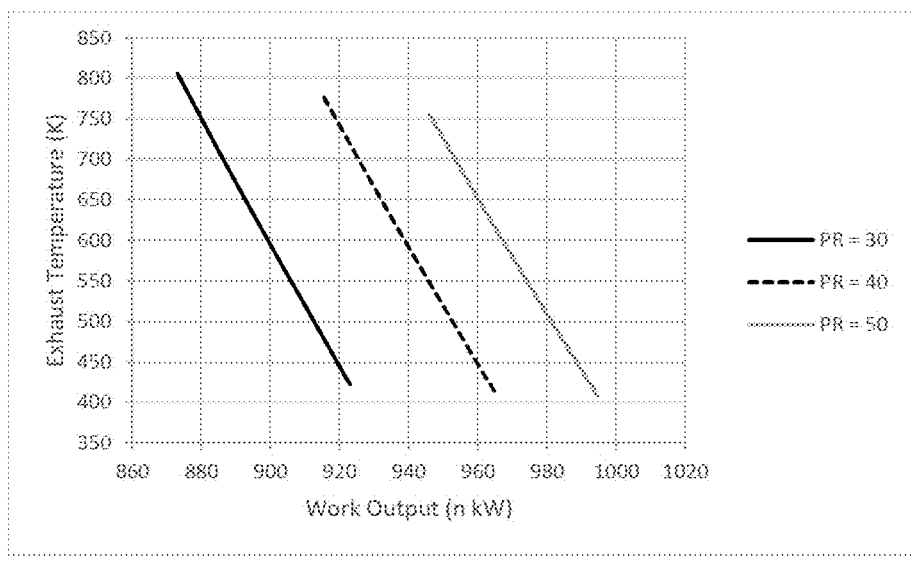
FIG. 4 is a diagram of system work output as a function of exhaust temperature and pressure ratio.

Examining FIG. 3 and FIG. 4 together shows that higher combustion temperatures results in material being exhausted from the Brayton cycle at higher temperature. Exhausting at higher temperature is effectively a loss of potential power and thus actually represents a loss of efficiency for the system as a whole. The Brayton cycle would indeed be more efficient but the system as a whole would actually be less efficient. This is an interesting result showing the value of "systems-level" engineering, optimizing a single unit in a system may actually have a negative effect on the system as a whole.

FIG. 3 and FIG. 4 represent the work output from the system turbines but recall that the gasification section of the process requires an input of energy to function. The most obvious way to proceed would be to use some of the power from the turbines to provide the energy needed for gasification, any excess would then be a net output of work for the system.

Figure 5:
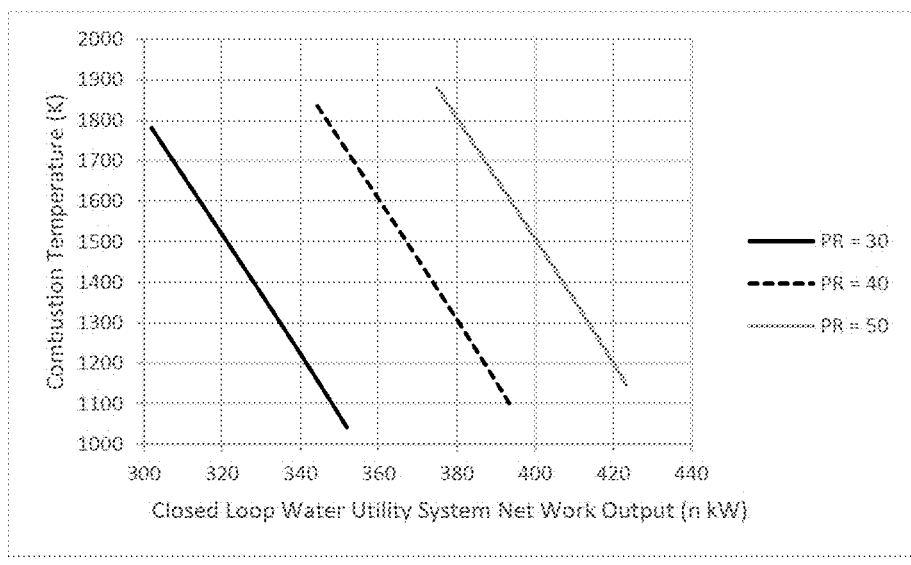
FIG. 5 is a diagram of net work output for a closed loop water utility system after supplying energy requirements to gasification and pumping as a function of combustion temperature and pressure ratio.

Naturally, supplying the energy to gasification (and other units) will affect the total amount of work the IGCC system can produce and reduce the overall thermal efficiency of the system as a whole, FIG. 5.

The thermal efficiency of the system can be derived as follows, $$\mu_{thermal,brayton+steam} = \frac{(W_{brayton} + W_{steam})}{Q}$$

Similarly for the system, $$\mu_{thermal,system} = \frac{W_{system}}{Q}$$

Where:

$\mu_{thermal,Brayton+steam}$ is the thermal efficiency of the Brayton cycle and steam turbines as defined by [Eq. 2]

$W_{brayton}$ is the work produced by the Brayton cycle without supplying energy to gasification $W_{steam}$ is the work produced by the steam turbines without supplying energy to gasification $W_{system}$ is the work produced by the system after supplying energy to gasification Q is the total energy available in the system.

Since the total system energy is the same in both cases, the thermal efficiency of the system is given by [Eq. 3], $$\mu_{thermal,system} = \frac{W_{system}}{W_{brayton} + W_{steam}}\left(1 - \frac{T_1}{T_2}\right) \qquad \text{[Eq. 3]}$$

Figure 6:
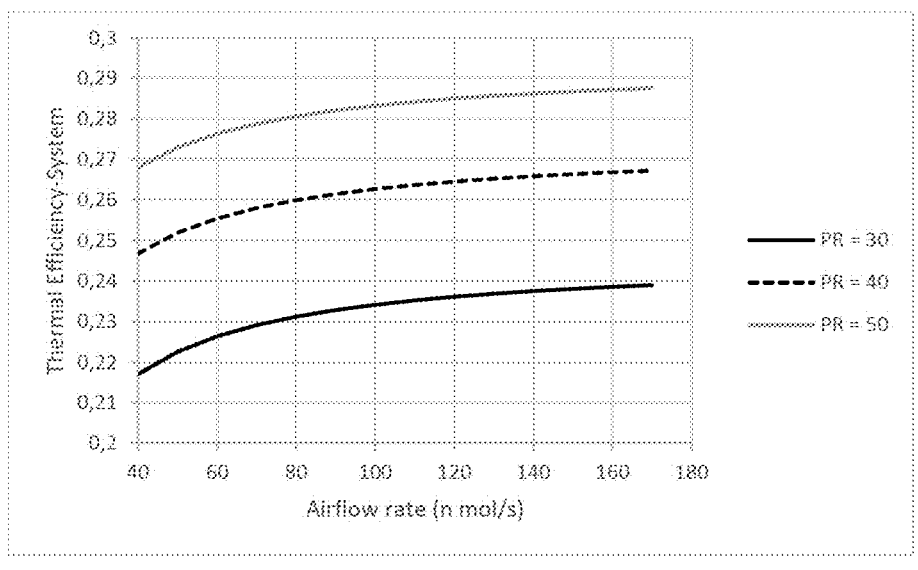
FIG. 6 is a diagram of system thermal efficiency for the closed loop water utility system as a function of airflow rate and pressure ratio.

FIG. 6 shows that the thermal efficiency of the system is not a particularly strong function of either airflow or pressure ratio, with the range being between 22 and 29%. Larger pressure ratios generally requires larger (and more expensive) equipment, FIG. 6 shows that it could be a viable design trade-off to sacrifice a few percent of efficiency for an overall cheaper system. Further examination on the subject of equipment shows that the work contribution of the steam turbines is small compared to the work output of the Brayton Cycle.

Figure 7:
FIG. 7 is a diagram of work output of the Brayton cycle compared to the work output of steam turbines as a function of airflow rate.

FIG. 7 shows the work output of the Brayton cycle as a region for the pressure ratios between 30 and 50. This region is between 850 n and 1000 n kW. The contribution made by the steam turbines is small by comparison, 25 n kW, The presence of both steam turbines increases the efficiency of the system by only 1.7%.

Case 2: Integrated Water Utility System

One significant shortcoming of turbines, especially steam turbines, is that there is no reliable way to recover the energy of vaporization of the fluid passing through the turbine. This is due to cavitation effects when running turbines (or pumps) in the two-phase region. This energy is substantial, far greater than energy contributed from heat capacity. Being able to recover the energy of vaporization would see significant increases in system thermal efficiency.

Examination of FIG. 1 shows a fresh feed of 2 n mol/s liquid water (14) was supplied to the gasification with an energy requirement of 571.1 n kW. A portion of this energy requirement was needed to vaporize the water. However, leaving the final steam turbine is the same amount of water, 2n mol/s (66) but this water is not liquid phase, it is dry saturated steam at ambient pressure. If this saturated steam was fed to the gasification, the energy requirements for gasification would change to:

$$\Delta H_{gasification} = 494.8n \text{ kW}$$

The numbers shown in FIG. 2, FIG. 3 and FIG. 4 remain unchanged, what changes are the overall work output and the thermal efficiencies of the system as a whole.

Figure 9:
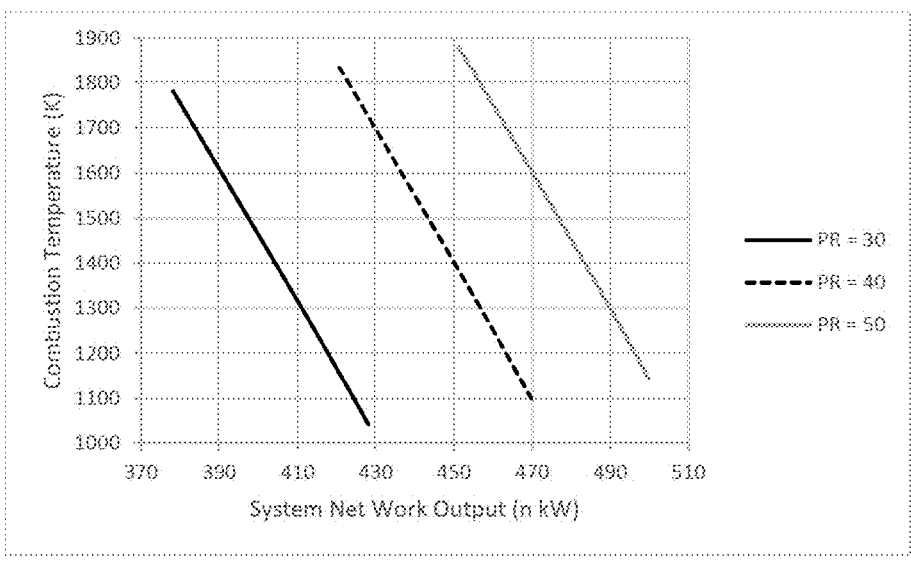
FIG. 9 is a diagram of system net work output of the integrated water utility system as a function of combustion temperature and pressure ratio.
Figure 10:
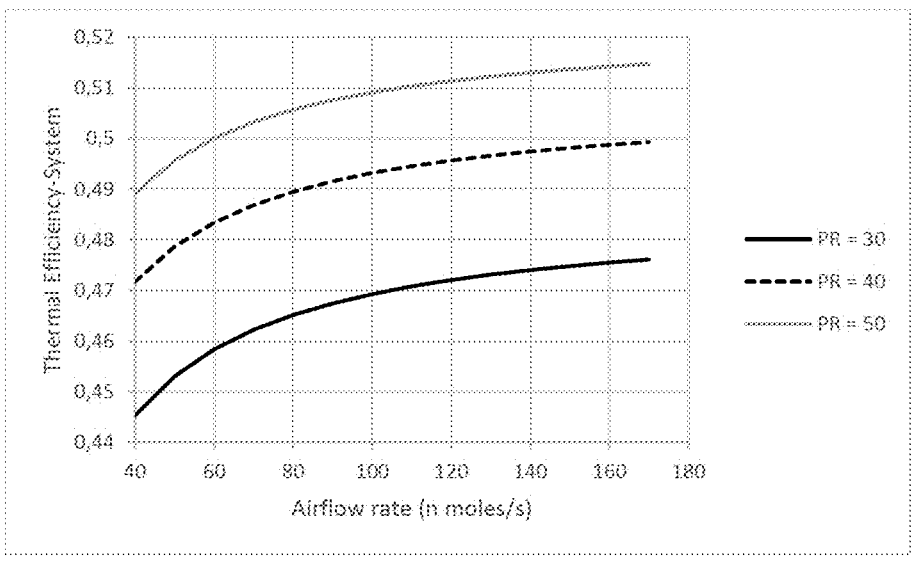
FIG. 10 is a diagram of system thermal efficiency for the integrated water utility system as a function of airflow rate and pressure ratio.

FIG. 9 and FIG. 10 shows an increase in the net work output of the system and a two-fold increase in the overall thermal efficiency. These increases are a result of not having to vaporize the water feed to gasification. While the work contribution of the steam turbines remains small, the presence of the water utility allows for the recovery of the energy of vaporization. This recovery would not be possible without the presence of the utility itself.

Renewable Energy Sources for Gasification

Thus far, the energy needed for gasification has been supplied from the turbines within the IGCC system itself. An alternative approach would be to supply this energy from other sources, such as wind or solar power.

In the case of the "closed loop" utility IGCC system, a standard 2.5 MW industrial wind turbine, functioning at 35% efficiency could supply enough energy to gasification to process 1 mol/s of $(C_2H_4)_n$. For the "integrated" water utility IGCC system, the same processing rate could be achieved with a standard 1.5 MW turbine. This would require a capital investment of 3-4 million US-dollars, for the wind turbine.

For solar power, taking the cost of a solar tower facility to be 6300 US-dollars/kW [12], a capital of 3.6 million US-dollars could process 1 mol/s of $(C_2H_4)_n$ for the "closed looped" and 3.1 million US-dollars for the "integrated" system.

While this may seem like substantial investment for comparatively small processing rates, it is worthwhile to note that by using a renewable energy source in the manner avoids having to divert some of the power from the IGCC system itself. By taking in 571.1 n kW (closed utility) or 494.8 n kW (integrated utility) from renewable energy, the system will produce work as shown in FIG. 3 and FIG. 4. The energy being produced by IGCC system is clearly greater than the energy needed by the gasification.

There are clear advantages for some countries. For example, China [13] has a large amount of decommissioned wind power due to grid instability and congestion, among other reasons. They also have large stockpiles of waste plastic imported from the rest of the world. Some of these wind turbines could be recommissioned to gasify their stockpiles of waste plastic and produce a larger amount of energy than the wind turbines would produce alone, reducing the volume of a waste material and producing a greater amount of power.

Many African countries have significant infrastructure issues in electricity supply and dealing with vast amounts of waste plastic. These nations have stable, almost year round, sunshine. Using solar power with this IGCC system allows a waste material to be turned into sorely needed power, in amounts greater than the solar power would produce on its own.

Design of Waste Polyethylene IGCC

All of the previous analysis was carried out in such a way that all the numbers could be scaled with 1 mol/s of $(C_2H_4)$, and in the monomer number itself. Polyethylene monomer counts can vary considerably, between two and twenty thousand. In this demonstration a single value for n will be chosen, =4000 with the "integrated" water utility IGCC system. Thus, $$(-C_2H_4-)_{4000} + 8000H_2O \rightarrow 8000CO + \\ 16000H_2 \Delta H_{gasification} = 4000(494.8)kW = 1979200 \\ kW$$

Using FIG. 2, selecting a pressure ratio of 50, and keeping the combustion temperature at around 1300K, an airflow rate of around 105 n mol/s is needed. For n=4000, the airflow rate should be 420000 mol/s. The net work output and then be read from FIG. 9 as 490 kW/n, or 1960000 kW. The thermal efficiency of this system can be read from FIG. 10 as approximately 51%. The process in FIG. 1 can be scaled and completed.

Figure 8:
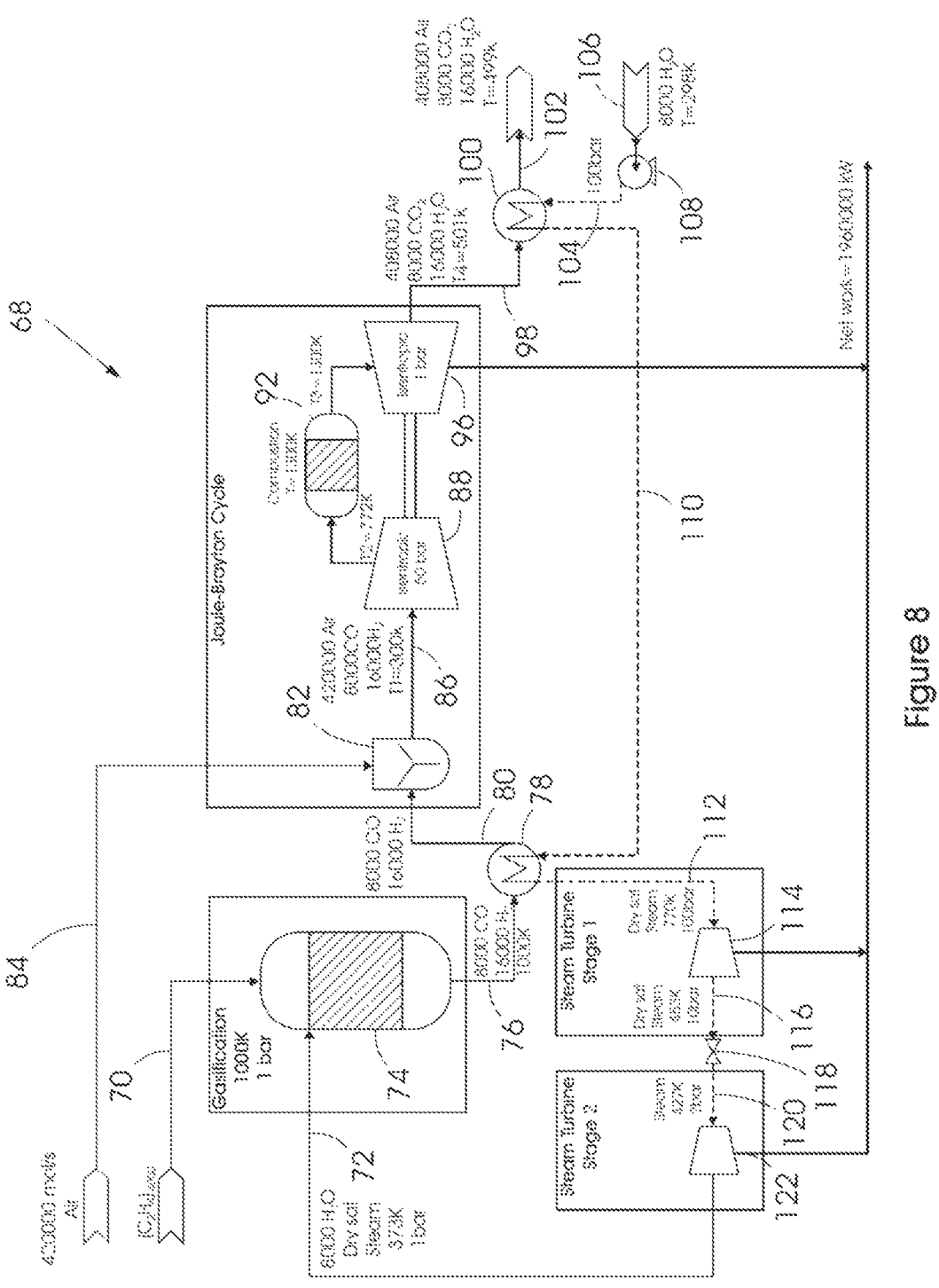
FIG. 8 is a process flow diagram for converting waste plastic, in particular polyethylene waste, into power using an IGCC and an Integrated water utility system scaled for n=4000.

With reference to FIG. 8, a process flow diagram for converting waste plastic, in particular polyethylene waste into power using an IGCC and an Integrated water utility system scaled for n=4000 (68), 1 mol/s of $(C_2H_4)_{4000}$ (70) is gasified in a gasifier (74) with dry saturated steam (72) at 1000K and 1 bar pressure. The gasification (74) temperature and pressure is chosen on a thermodynamic basis for complete gasification. Different conditions may be preferable for many reasons, such as kinetics.

The syngas (76) leaving the gasifier (74) is cooled, for example in a heat exchanger (78), with water (110) before being mixed, for example in a mixer (82), with air (84). The flow rate of air (84) is chosen primarily to ensure complete combustion of the synthesis gas (80). The air and syngas mixture (86) is fed to the compressor (88). This combustion (92) releases a large amount of energy. The present invention generally attempts to keep combustion temperature below 1300K, which is high for nickel alloys but does not require super-alloys.

The compressor (88) and turbine (96) of the Brayton cycle (88-96) are assumed to perform isentropically.

The hot exhaust (98) leaving the turbine (96) is cooled by water (104), for example in a heat exchanger (100), producing a hot exhaust (102), before either being vented to atmosphere or proceeding to some form of carbon sequestration.

On the utility side, the dashed lines on FIG. 8, water (106) is first pumped (108) to 100 bar (46) and is then used to cool the hot exhaust (98) from the system and the water (110) is then used to cool the syngas (76) leaving the gasifier (74). The final objective was to raise steam at 100 bar and 770 K (112), which are conditions typically handled by commercially available steam turbines.

In "Stage 1", the steam (112) passes through an isentropic turbine (114) and leaves as dry saturated steam (116). Since the pressure of this steam (116) is still elevated (10-12 bar), a second stage is included to bring the steam down to ambient pressure and recover a little extra work at the same time. The steam (116) goes through an adiabatic decompression (118) and the steam (120) from the adiabatic decompression (118) is sent to the "Stage 2" steam turbine (122). Dry saturated steam (72) is exhausted from the final turbine (122). This dry saturated steam (72) is sent to the gasifier (74) as a feed, as an "integrated" water utility.

The system shown in FIG. 8 will take 1 mol/s of $(C_2H_4)_{4000}$ (70), 112 kg/s, and produce 1 GW of work at a thermal efficiency of around 51% These values can be further scaled to any value desired. For instance, if it is desired to process 0.5 mol/s of $(C_2H_4)_{4000}$ instead of 1 mol/s, all the values can be divided by 2. This is exactly analogous to processing 1 mol/s of $(C_2H_4)_{2000}$.

If the gasification energy of 1.98 GW was supplied from another source, such as wind or solar, the work output could be read from FIG. 3, $$Work = 990(4000)kW = 3.96 \ GW$$

There is no doubt that 112 kg/s of $(C_2H_4)_{4000}$ is a significant amount of polyethylene but this does allow the amount of energy produced per kilogram.

$$Work = \frac{3.96GW}{112 \ kg/s} = \frac{35.36MJ}{kg(C_2H_4)_{4000}}$$

This example also leads into another valuable result. The molecular weight of $(C_2H_4)_n$ can be determined, in terms of the monomer number, as $$mw = 0.028n \ kg/mol$$

Where:

mw is the molecular weight 28 is the sum of two carbon atoms and four hydrogen atoms.

Since the general solution, resulting from the analysis of FIG. 1, always used 1 mols/s as a basis for polyethylene flow rate and provided the energy in terms of n, dividing the energy output by the molecular weight would result in the energy output of the IGCC systems per mass of polyethylene.

This means the energy output of the IGCC system per mass of polyethylene is actually independent of the monomer number.

Modifications can now be made to present the net work output for the IGCC system per ton of polyethylene.

Figure 11:
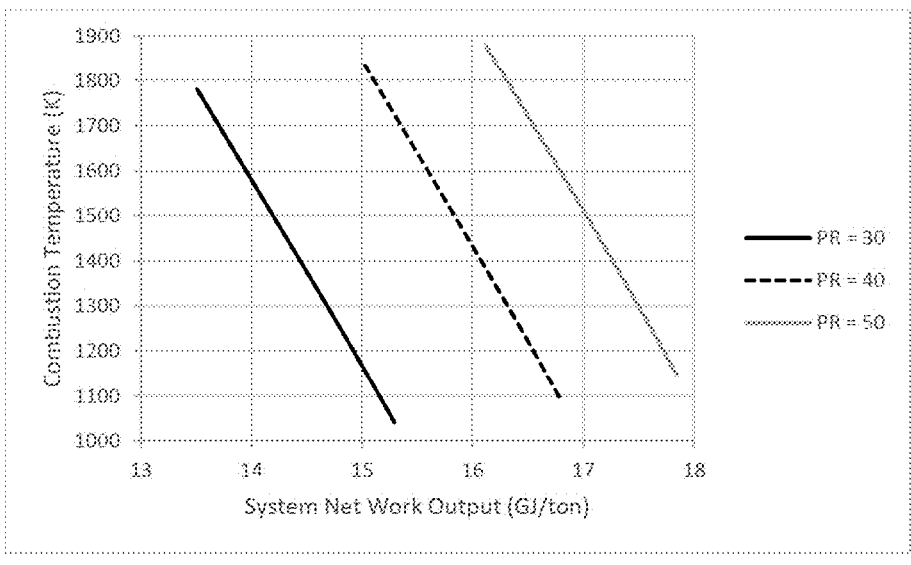
FIG. 11 is a diagram of net energy output for the water integrated IGCC system per ton of polyethylene using some of the turbine power for gasification as a function of combustion temperature and pressure ratio.
Figure 12:
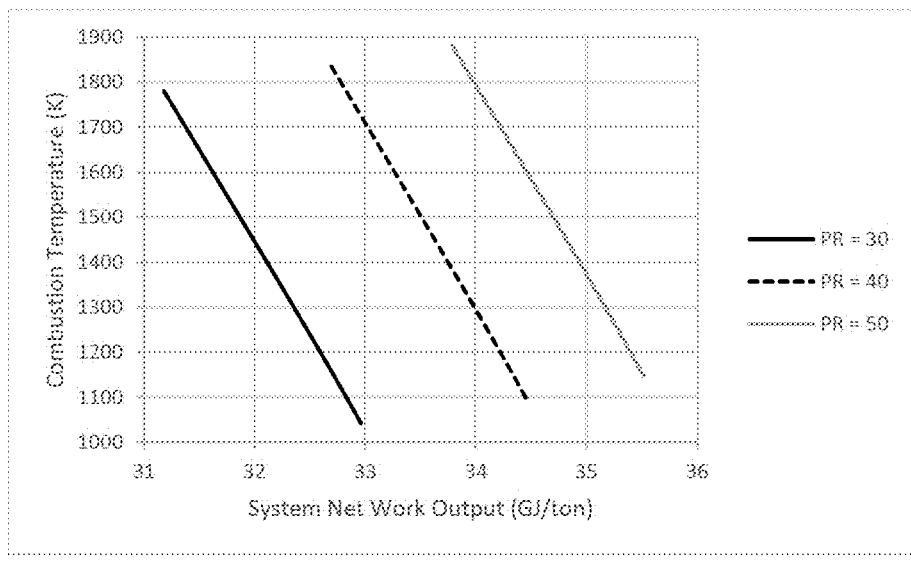
FIG. 12 is a diagram of net energy output for the water integrated IGCC system per ton of polyethylene using a renewable energy source for gasification as a function of combustion temperature and pressure ratio.

The net power output of a conventional coal fired IGCC is around 9.6 GJ per ton of coal [14], FIG. 11 shows that the use of waste polyethylene has a net power output between 13 and 18 GJ per ton of polyethylene. This is an increase of between 35 and 85 percent! Even if the isentropic assumption was released, this is still a significant increase. FIG. 12 shows even larger gains. This polyethylene system also does not contain any contaminants typical in coal, such as sulphur. Polyethylene also has a very small (negligible, even) ash content. This particular design also requires no air separation.

Conclusion

The first system, called the "Closed loop water utility" system, uses a cooling water utility system that is isolated from the process itself, this water utility cools the process exhaust streams and attempts to recover some extra work in steam turbines.

The net-work output and thermal efficiencies of this system is depicted in FIG. 5 and FIG. 6 respectively and ranges between 300 n to 410 n kW and between 21 and 29% thermal efficiency. This closed loop water utility system would be simpler to run since it is not integrated with the IGCC itself. However, this system suffers from not being able to recover the energy required to vaporize water. It was found that the steam turbines only recover a very small amount of energy comparted to the Brayton cycle and may not be worth the added capital and operational costs at all.

The second system, called the "integrated water utility" system, used the steam generated by the water utility as the feed to the main process system. The net-work output and thermal efficiencies of this system are depicted in FIG. 9 and FIG. 10. The net-work output ranges between 370 n KW and 510 n kW, while the thermal efficiency ranges between 44 and 52%. While the work contribution is still small, they play a vital role in allowing the system as a whole to recover a significant portion of the energy needed to vaporize water. It is clear that this system is a more efficient design but would probably be more complex due to its integrated nature.

The integrated water utility system was then carried out by selecting an actual value for the monomer number, n. In this case n=4000. An interesting result from this case study revealed that the net-work output of the system per unit mass is actually independent of the monomer number itself. This means any size of molecule can be chosen as long as the molecule can be divided into regular monomer chains and good physical data for the chosen molecule size exists. This has implications for the design of any system seeking to treat chemically complex material. For instance, biomass could be approximated as glucose and the result is not just and approximation but is actually accurate per mass of biomass.

The net-work output per ton of polyethylene is shown in FIG. 11 and varies between 13 and 18 GJ per ton of polyethylene. The net-work output for a conventional goal IGCC is around 9.6 GJ per ton of coal. In addition to increased potential of power output, this waste polyethylene system has additional advantages:

This system requires no air separation.

Polyethylene does not contain contaminants commonly seen in coal processes.

Polyethylene has a small-to-negligible ash content.

Coal needs to be purchased from mines. It is entirely possible that local and national governments will actually pay to have waste plastic removed.

These advantages can be magnified even further by making use of a renewable energy source to facilitate the gasification of polyethylene.

It seems clear that polyethylene, and other plastics, are actually contain a large amount of chemical energy and are a potentially valuable chemical feedstock. It seems the view that plastic is a "waste" is actually a narrow one. The reality appears to be that waste plastics contain immense potential and opportunity.

References

1. Grand View Research: Plastics Market Size Analysis, Trends | Global Industry Report, 2020.
2. Europe, P.: World Plastics Production 2006-2015.
3. Transparency Market Research: Plastic Packaging Market (Product Types—Rigid Plastic Packaging and Flexible Plastic Packaging; Applications—Food & amp; Beverages, Industrial, Household Products, Personal Care, Medical, and Automotive Components)—Global Industry Analysis, Size, Share, Growth, Trends and Forecast 2014-2020.
4. Geyer, R., Jambeck, J. R., Law, K. L.: Production, use, and fate of all plastics ever made.
5. Reuters: China's plastic demand to rise as foreign garbage ban to curb recycled supply, https://www.reuters.com/article/us-china-plastics-demand/chinas-plastic-demand-to-rise-as-foreign-garbage-ban-to-curb-recycled-supply-idUSKCN1BO0J8
6. Jambeck, J. R., Geyer, R., Wilcox, C., Siegler, T. R., Perryman, M., Andrady, A., Narayan, R., Law, K. L.: Marine pollution. Plastic waste inputs from land into the ocean. Science. 347, 768-71 (2015). doi:10.1126/science.1260352
7. Emun, F., Gadalla, M., Majozi, T., Boer, D.: Integrated gasification combined cycle (IGCC) process simulation and optimization. Comput. Chem. Eng. 34, 331-338 (2010). doi:10.1016/J.COMPCHEMENG.2009.04.007
8. Ståhl, K., Neergaard, M.: IGCC power plant for biomass utilisation, Värnamo, Sweden. Biomass and Bioenergy. 15, 205-211 (1998). doi:10.1016/50961-9534(98)00025-7
9. Descamps, C., Bouallou, C., Kanniche, M.: Efficiency of an Integrated Gasification Combined Cycle (IGCC) power plant including CO2 removal. Energy. 33, 874-881 (2008). doi:10.1016/J.ENERGY.2007.07.013
10. Khaliq, A., Kaushik, S. C.: Second-law based thermodynamic analysis of Brayton/Rankine combined power cycle with reheat. Appl. Energy. 78, 179-197 (2004). doi:10.1016/J.APENERGY.2003.08.002
11. Chen, L., Sun, F., Wu, C., Kiang, R. L.: Theoretical analysis of the performance of a regenerative closed Brayton cycle with internal irreversibilities. Energy Conyers. Manag. 38, 871-877 (1997). doi:10.1016/50196-8904(96)00090-8
12. Renewable Energy Agency, I.: Renewable Energy Cost Analysis: Concentrating Solar Power. (2012)

13. National Energy Administration: Lots of wind power wasted: energy administration—China.org.cn.

14. Emun, F., Gadalla, M., Majozi, T., Boer, D.: Integrated gasification combined cycle (IGCC) process simulation and optimization. Comput. Chem. Eng. 34, 331-338 (2010). doi:10.1016/J.COMPCHEMENG.2009.04.007

What is claimed is:

1. A process for converting carbon material into power, comprising the steps of:
    a. gasifying the carbon material into synthesis gas in a gasifier, wherein a first dry saturated steam stream is supplied to the gasifier and the gasification is carried out without oxygen or air;
    b. supplying the synthesis gas to a gas turbine to produce power, wherein air is added to the synthesis gas prior to the gas turbine;
    c. supplying water to a first cooling device and cooling exhaust gas from the gas turbine with the water in the first cooling device to produce a second dry saturated steam stream;
    d. using the second dry saturated steam stream in a first steam turbine to produce power and a third dry saturated steam stream;
    e. sending the third dry saturated steam stream to a decompression device to produce a steam stream; and
    f. utilizing the steam stream to produce the first dry saturated steam stream in a second steam turbine, wherein power from the gas turbine or steam turbine or power from a renewable energy source, or a combination of at least two or more thereof are/is used in the gasifier.

2. The process as claimed in claim 1, wherein the carbon material is waste plastic.

3. The process as claimed in claim 2, wherein the waste plastic is polyethylene or polyethylene terephthalate.

4. The process as claimed in claim 1, wherein the temperature of the gasifier is between 800K and 1200K and the pressure of the gasifier is between 0.5 to 1.5 bar.

5. The process as claimed in claim 1, wherein the temperature of combustion in the gas turbine is below 1800K.

6. The process as claimed in claim 1 further comprising supplying water to a second cooling device and cooling synthesis gas from the gasifier with the water in the second cooling device.

7. The process as claimed in claim 6, wherein the first cooling device and the second cooling devices are in fluid communication and together produce the second dry saturated steam stream.

8. The process as claimed in claim 7, wherein the steam produced has a temperature of between 570K and 980K and the pressure of the steam produced is between 120 bar and 80 bar.

9. The process as claimed in claim 6 further comprising a pump to increase the pressure of water prior to being sent to the first cooling device or second cooling device.

* * * * *